(12) United States Patent
Staffer et al.

(10) Patent No.: US 9,043,373 B2
(45) Date of Patent: May 26, 2015

(54) SYSTEM AND METHOD FOR EFFICIENT DATA STORAGE

(75) Inventors: Andrew Staffer, Sylmar, CA (US); Noah T. Rowles, Pasadena, CA (US)

(73) Assignee: iolo technologies, LLC, Pasadena, CA (US)

( * ) Notice: Subject to any disclaimer, the term of this patent is extended or adjusted under 35 U.S.C. 154(b) by 0 days.

(21) Appl. No.: 12/806,617

(22) Filed: Aug. 17, 2010

(65) Prior Publication Data
US 2012/0047189 A1 Feb. 23, 2012

(51) Int. Cl.
*G06F 17/30* (2006.01)

(52) U.S. Cl.
CPC ................... *G06F 17/30138* (2013.01)

(58) Field of Classification Search
CPC ............. G06F 3/0641; G06F 11/1068; H04L 29/06047; H04L 67/42; H04L 63/0227; H04L 67/1095; H03M 13/03
See application file for complete search history.

(56) References Cited

U.S. PATENT DOCUMENTS

| | | | |
|---|---|---|---|
| 5,398,142 A | 3/1995 | Davy | |
| 5,551,020 A * | 8/1996 | Flax et al. | 707/999.101 |
| 5,930,828 A * | 7/1999 | Jensen et al. | 711/170 |
| 6,609,176 B1 * | 8/2003 | Mizuno | 711/114 |
| 6,633,968 B2 | 10/2003 | Zeiegincew et al. | |
| 7,634,471 B2 * | 12/2009 | Chen et al. | 707/999.003 |
| 7,870,128 B2 * | 1/2011 | Jensen et al. | 707/727 |
| 2007/0027940 A1 * | 2/2007 | Lutz et al. | 707/205 |
| 2008/0027905 A1 | 1/2008 | Jensen et al. | |
| 2008/0104150 A1 * | 5/2008 | Moore et al. | 707/205 |
| 2008/0184367 A1 * | 7/2008 | McMillan et al. | 726/23 |
| 2008/0288738 A1 | 11/2008 | Gokhale et al. | |
| 2009/0113160 A1 | 4/2009 | Ferraro | |
| 2009/0132621 A1 * | 5/2009 | Jensen et al. | 707/205 |
| 2010/0257146 A1 * | 10/2010 | Memon et al. | 707/693 |

* cited by examiner

*Primary Examiner* — Dinku Gebresenbet

(74) *Attorney, Agent, or Firm* — Brokaw Patent Law PC; Christopher J. Brokaw

(57) ABSTRACT

A system and method for efficient data storage, which reduces data entropy of data on a data storage device. The technique organizes related data entities (such as files on a hard drive) in close physical proximity and in a predictive or ordered sequence, to reduce the amount of time and effort (mechanical, computational, or otherwise) a storage/retrieval device needs to expend locating each related data entity as it processes a sequence of requests. In addition, the data may be organized and stored according to a file directory index structure, whereby file fragmentation is reduced.

30 Claims, 14 Drawing Sheets

```
*******************************************
Analyzing - c:\program files\adobe\reader 9.0
*******************************************
Data Defrag  - Move files to front --c:\program files\adobe\reader 9.0
--c:\program files\adobe\reader
9.0 readme.htm
--c:\program files\adobe\reader 9.0\esl
--c:\program files\adobe\reader
9.0\esl\aiodllite.dll
--c:\program files\adobe\reader 9.0\reader
--c:\program files\adobe\reader
9.0\reader\a3dutility.exe
--c:\program files\adobe\reader
9.0\reader\ace.dll
--c:\program files\adobe\reader
9.0\reader\acrobroker.exe
--c:\program files\adobe\reader
9.0\reader\acrofx32.dll
--c:\program files\adobe\reader
9.0\reader\acrord32.dll
--c:\program files\adobe\reader
9.0\reader\acrord32.exe
--c:\program files\adobe\reader
9.0\reader\acrord32info.exe
--c:\program files\adobe\reader
9.0\reader\acrotextextractor.exe
--c:\program files\adobe\reader
9.0\reader\adobecollabsync.exe
--c:\program files\adobe\reader
9.0\reader\adobelinguistic.dll
--c:\program files\adobe\reader
9.0\reader\adobeupdater.dll --c:\program files\adobe\reader
9.0\reader\adobexmp.dll
--c:\program files\adobe\reader
9.0\reader\agm.dll
--c:\program files\adobe\reader
9.0\reader\agmgpuoptin.ini
--c:\program files\adobe\reader
9.0\reader\ahclient.dll
--c:\program files\adobe\reader
9.0\reader\atl.dll
--c:\program files\adobe\reader
9.0\reader\authplay.dll
--c:\program files\adobe\reader
9.0\reader\axe8sharedexpat.dll
--c:\program files\adobe\reader
9.0\reader\axsle.dll
--c:\program files\adobe\reader
9.0\reader\bib.dll
--c:\program files\adobe\reader
9.0\reader\bibutils.dll
--c:\program files\adobe\reader
9.0\reader\ccme_base.dll
--c:\program files\adobe\reader
9.0\reader\cooltype.dll
--c:\program files\adobe\reader
9.0\reader\cryptocme2.dll
--c:\program files\adobe\reader
9.0\reader\cryptocme2.sig
--c:\program files\adobe\reader
9.0\reader\eula.exe
--c:\program files\adobe\reader
9.0\reader\icucnv36.dll
--c:\program files\adobe\reader
9.0\reader\icudt36.dll
--c:\program files\adobe\reader
9.0\reader\jp2klib.dll --c:\program files\adobe\reader
9.0\reader\logsession.dll
--c:\program files\adobe\reader
9.0\reader\logtransport2.dll
--c:\program files\adobe\reader
9.0\reader\logtransport2.exe
--c:\program files\adobe\reader
9.0\reader\onix32.dll
--c:\program files\adobe\reader
9.0\reader\pdfprevhndlr.dll
--c:\program files\adobe\reader
9.0\reader\pdfsigqformalrep.pdf
--c:\program files\adobe\reader
9.0\reader\pe.dll
--c:\program files\adobe\reader
9.0\reader\pmd.cer
--c:\program files\adobe\reader
9.0\reader\reader_sl.exe
--c:\program files\adobe\reader
9.0\reader\rt3d.dll
--c:\program files\adobe\reader
9.0\reader\rtc.der
--c:\program files\adobe\reader
9.0\reader\sqlite.dll
--c:\program files\adobe\reader
9.0\reader\vdk150.dll
--c:\program files\adobe\reader
9.0\reader\viewerps.dll
--c:\program files\adobe\reader 9.0\reader\air
--c:\program files\adobe\reader
9.0\reader\air\nppdf32.dll
--c:\program files\adobe\reader 9.0\reader\amt
. . .
```

FIG. 3

SYSTEM AND METHOD FOR EFFICIENT DATA STORAGE

BACKGROUND OF THE INVENTION

1. Field of the Invention

The present invention relates generally to data storage, and more particularly, to an improved technique for file storage to improve system performance.

2. Description of the Related Art

File fragmentation is a well-known problem in computer data storage. In a typical file system, files are stored in units called clusters. When files are initially stored on a new storage device, it may generally be possible to store them in a set of one or more contiguous clusters that start at one physical location. However, as files are modified, added and removed it may no longer be possible to store a particular file in one location, and the file is broken up and stored in multiple logically linked locations. This is called file fragmentation. In some instances, the physical data within a single file may be stored in several hundred or more different locations, generally requiring a storage device to stop at the end of each "fragment" and relocate its reading apparatus to the beginning of the next fragment this same number of times in order to process the entire file.

As noted above, files are generally stored within units of physical space on a storage device known as clusters (or blocks in some file systems). The uniform data capacity of each cluster is determined by the file system. Typically, each cluster will only contain data from a single discrete file (if it contains data at all) and not data from more than one file, even if the total size of the data within the file is less than the data capacity of a single cluster. Unused clusters that have never had data written to them or clusters where data has been logically deleted are known as "free space." In addition, when two files are placed near each other on the disk, but leave one or more entire clusters between them, the empty clusters also form "free space." For the purposes of this document, and as understood by the current state of the art in file systems, the unused fractions of a cluster (sometimes called "slack space") are not considered free space.

When many empty clusters are available contiguously on the disk, large files may be written to them in a single contiguous sequence. However, as files are modified, added and removed numerous physical locations containing free space on the storage device become too small to contiguously store files beyond a certain size, even though the total available space may be sufficient. This is called free space fragmentation.

File fragmentation can cause significant system performance degradation, especially when utilizing mechanical storage devices such as magnetic hard drives, since it will require numerous mechanical head repositions to read a single file on the device. Moreover, free space fragmentation can cause significant performance degradation when writing to the storage device, as the file system must split large files across multiple slivers of available disk space. When utilizing mechanical storage devices such as magnetic hard-drives, this necessitates moving the drive head to multiple locations while writing. A file written to free space that is fragmented will necessarily be fragmented, and this is a common root cause of file fragmentation. To alleviate these problems, software programs have been developed to "de-fragment" a storage device. These programs generally operate to re-arrange the file clusters so that each file is stored contiguously in a single location, and to consolidate, to the extent possible, the small, free space locations. However, this approach only temporarily improves system performance to a limited degree, since the storage device will soon become fragmented again, and only improves performance with respect to an individual file, and not with respect to a plurality of related files, such as all the files that are read when starting a specific software application.

For example, as described in U.S. Pat. No. 5,398,142:

Many commercial products attempt to address and overcome the problem of file fragmentation. One such product is PC Tools Deluxe™ by Central Point Software, Inc. The software package includes a feature which arranges the files on a hard disk or diskette such that each file is contained in one contiguous area. Another feature unfragments files and moves free space to the back of the disk. The software also permits files to be arranged in a predetermined manner on the hard disk. For example, all files for a given subdirectory may be kept together to keep data and program overlay files adjacent one another. This reduces the amount of disk head movement needed. A directory sort feature permits the files within directories to be sorted by file name, file time, file extension, or file size. Information regarding these features may be found in PC Tools Deluxe, Version 5, December 1988. However, this and similar products arrange free space at the back of the disk. As described above, as files are created and deleted, contiguous free space deteriorates and the fragmentation problems return.

To further improve system performance, specifically during boot time, the Microsoft Windows™ operating system includes a component called Prefetcher. As described in U.S. Pat. No. 6,633,968, the Prefetcher works by monitoring the executable code and data that is accessed during the boot process, and recording a log file of this activity. Prefetcher then uses a predictive, probabilistic algorithm applied to the information recorded in the log file to load the code and data in a more optimal fashion. In addition, a defragmenter is used to place the particular executable files loaded by the Prefetcher on a particular location and in a particular order on the storage device. For example, the files may be stored on a reserved, higher-speed access area of the storage device. One disadvantage of the Prefetcher algorithm is that certain files may continually be loaded during the boot process, even if at some point they are no longer used by the user.

Another technique for improving system performance is disclosed in U.S. Patent Application Publication No. 2008/0027905. Files to be stored on one or more storage devices are classified into "rankings" of different sets. Differences in retrieval value of different regions are exploited by selecting which files to store in which regions. For example, files having a higher classification are stored in regions with faster retrieval times. This, and similar techniques, are generally referred to as "disk optimization." Some disk optimization techniques track frequently-used files to apply priority rankings. Higher priority files are written to the fastest region, and lower priority files are written to slower regions.

As discussed above, optimizing a storage device merely by moving certain files to a specific location on the device may provide some performance increase in some cases. For example, if a group of document files were all relocated to a specific physical location on a storage device, a performance increase may be realized if the files are viewed one after another. However, if the user wants to edit the same files with a document editing application, its program application files, their dependencies, and associated tools which all must be physically read prior to using the application may be physically scattered in a disorganized and unpredictable manner around the storage device (for the purposes of this document, this is referred to as "data entropy"), resulting in an exorbitant number of times the storage device is required to stop and reposition its reading apparatus as it reaches the end of one file and then locates the next file to be processed within the overall execution sequence. This "data entropy" within the storage device may have the effect of partially or entirely negating any performance improvements gained by grouping only the document files to be edited together, even if there is no file or free-space fragmentation. Such data entropy within the physical organization structure of discrete data entities on a storage device can result in a significant level of performance loss whether or not file or free space fragmentation exists.

As further described in U.S. Patent Pub. No 2008/0027905, data may also be grouped:

Classifying Files Based on Data Grouping

Grouping of files or parts of files together on a certain area of the storage medium can also significantly increase performance. For example if you launch a word processor, several different files and/or portions of files are loaded, additionally data may also be loaded at launch. If the computer has to go to several different areas of the disk to load the necessary files or parts of files it will take substantially longer than if all these files were in the same area on this disk. Further grouping folders (directories) with the files they contain will also speed up the computer system under certain circumstances. In order to determine what files to group we merely kept track of what files are read from the disk in sequence. When we can confirm a pattern then those files or portions of files are grouped together.

However, it has not been known to organize all files or data across an entire storage device, in a systematic fashion to improve system performance, without monitoring usage beforehand.

SUMMARY OF THE INVENTION

In general, the present invention is system and method for efficient data storage, which reduces data entropy of data on a data storage device. The technique organizes related data entities (such as files on a hard drive) in close physical proximity and in a predictive or ordered sequence, to reduce the amount of time and effort (mechanical, computational, or otherwise) a storage/retrieval device needs to expend locating each data entity as it processes a sequence of requests. For example, the data may be organized and stored according to a file directory index structure, whereby data and free space fragmentation is also reduced.

According to one embodiment, the present technique can be implemented as a computer-implemented method for arranging data files on a data storage device, comprising, determining logical data relationships of files on a data storage device, and re-arranging the files on the storage device by placing logically related files in close proximity to each other physically on the storage device, based on the determined logical data relationships, wherein the re-arranging is performed for substantially all of the files on the storage device.

According to another embodiment a computer-implemented method for arranging files on a computer system storage device comprises determining commonly used files based on an analysis of a type of computer system utilizing the storage device, including determining a type of operating system, determining commonly used files, and any related files, by monitoring system operation, determining a specific physical order to store the files on the storage device based on the determinations of commonly used files and related files, and re-arranging the files on the storage device according to the determined specific order by placing the files in sequential and contiguous locations on the storage device.

In another embodiment, a computer-implemented method for reducing data entropy on a data storage device of a computer system comprises determining a file directory indexing structure of a file system on a data storage device, including directories and files, analyzing available free space on the storage device, placing pre-determined files in a pre-determined location, and re-arranging all remaining files on the storage device by placing logically related files in close proximity to each other physically on the storage device, based on the file directory indexing structure, wherein the files are physically placed on the storage device according to a priority grouping of related files, wherein the prioritized grouping of files are placed contiguously in a next available prioritized free space chunk, and if the next free space chunk is filled before an entire grouping of files is stored, an additional free space chunk is selected for storing the grouping of files.

A computer readable medium including computer program code for arranging data files on a data storage device comprises computer program code for determining logical data relationships of files on a data storage device, and computer program code for re-arranging the files on the storage device by placing logically related files in close proximity to each other physically on the storage device, based on the determined logical data relationships, wherein the re-arranging is performed for substantially all of the files on the storage device.

Another computer readable medium including computer program code for arranging files on a computer system storage device comprises computer program code for determining commonly used files based on an analysis of a type of computer system utilizing the storage device, including determining a type of operating system, computer program code for determining commonly used files, and any related files, by monitoring system operation, computer program code for determining a specific physical order to store the files on the storage device based on the determinations of commonly used files and related files, and computer program code for re-arranging the files on the storage device according to the determined specific order by placing the files in sequential and contiguous locations on the storage device.

In one embodiment, a computer readable medium including computer program code for reducing data entropy on a data storage device of a computer system, the computer readable medium comprising computer program code for determining a file directory indexing structure of a file system on a data storage device, including directories and files, computer program code for analyzing available free space on the storage device, computer program code for placing pre-determined files in a pre-determined location, and computer program code for re-arranging all remaining files on the storage device by placing logically related files in close proximity to each other physically on the storage device, based on the file directory indexing structure, wherein the files are physically placed on the storage device according to a priority grouping of related files, wherein the prioritized grouping of files are placed contiguously in a next available prioritized free space chunk, and if the next free space chunk is filled before an entire grouping of files is stored, an additional free space chunk is selected for storing the grouping of files.

The present technique may be implemented as a computer system for arranging data files on a data storage device, said computer system comprising a processor for executing computer program code, the computer code comprising computer program code for determining logical data relationships of files on a data storage device, and computer program code for re-arranging the files on the storage device by placing logically related files in close proximity to each other physically on the storage device, based on the determined logical data relationships, wherein the re-arranging is performed for substantially all of the files on the storage device.

In another implementation, a computer system for arranging files on a computer system storage device comprises a processor for executing computer program code, the computer program code comprising computer program code for determining commonly used files based on an analysis of a type of computer system utilizing the storage device, including determining a type of operating system, computer program code for determining commonly used files, and any related files, by monitoring system operation, computer program code for determining a specific physical order to store the files on the storage device based on the determinations of commonly used files and related files, and computer program code for re-arranging the files on the storage device according to the determined specific order by placing the files in sequential and contiguous locations on the storage device.

A computer system for reducing data entropy on a data storage device comprises a processor for executing computer program code, the program code comprising computer program code for determining a file directory indexing structure of a file system on a data storage device, including directories and files, computer program code for analyzing available free space on the storage device, computer program code for placing pre-determined files in a pre-determined location, and computer program code for re-arranging all remaining files on the storage device by placing logically related files in close proximity to each other physically on the storage device, based on the file directory indexing structure; wherein the files are physically placed on the storage device according to a priority grouping of related files, wherein the prioritized grouping of files are placed contiguously in a next available prioritized free space chunk, and if the next free space chunk is filled before an entire grouping of files is stored, an additional free space chunk is selected for storing the grouping of files.

In one embodiment, a computer implemented method for reducing the data entropy of a collection of data comprises determining a level of data entropy in the collection of data, determining sub-groups of data within the collection of data that have logical relationships, and re-arranging the sub-groups of data according to the determined logical relationships in order to reduce the level of data entropy of the collection of data.

According to an alternate embodiment, a computer-implemented method for arranging data files on a data storage device comprises determining logical data relationships of files on a data storage device, and re-arranging the files on the storage device by placing logically related files in close proximity to each other physically on the storage device, based on the determined logical data relationships, wherein the re-arranging is performed without any prior analysis of file usage.

According to another alternate embodiment, a computer readable medium including computer program code for arranging data files on a data storage device comprises computer program code for determining logical data relationships of files on a data storage device, and computer program code for re-arranging the files on the storage device by placing logically related files in close proximity to each other physically on the storage device, based on the determined logical data relationships, wherein the re-arranging is performed without any prior analysis of file usage.

BRIEF DESCRIPTION OF THE DRAWINGS

The present invention will be readily understood by the following detailed description in conjunction with the accompanying drawings, in which:

FIG. 3 is a sample listing of a partial directory structure utilized by the present invention to order the files on a storage device;

DETAILED DESCRIPTION OF THE INVENTION

Figure 1:
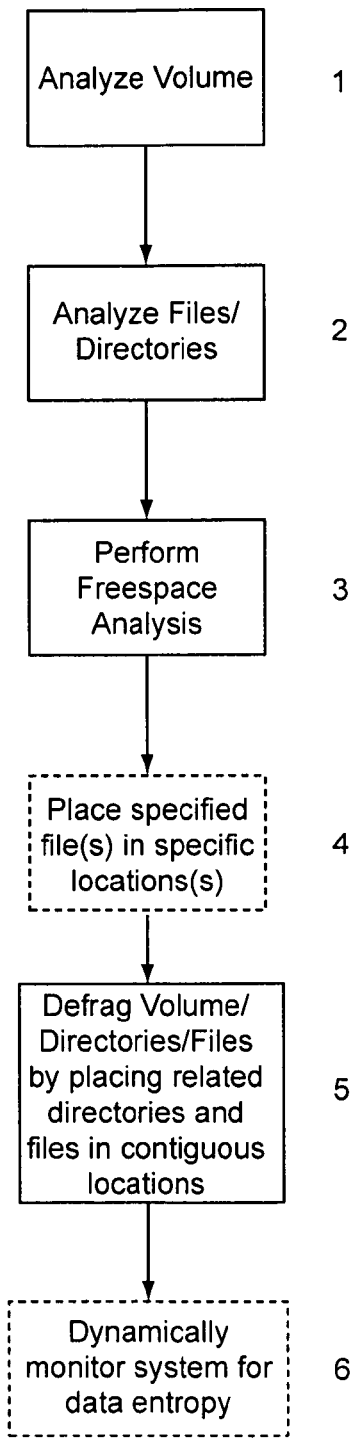
FIG. 1 is a flow chart illustrating one embodiment of the present invention.

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, the present invention organizes a related plurality of discrete data entities (such as files on a hard drive) in close physical proximity and in a predictive or ordered sequence, to reduce the amount of time and effort (mechanical, computational, or otherwise) a storage/retrieval device needs to expend locating each data entity as it processes a sequence of requests. As used herein the term "file" means any discrete entity of data, whether or not part of a particular file system or file system construct. In contrast to prior systems, the present technique can be applied to substantially all the files in a file system. The present technique can also be applied, even to a sub-set of files, without any prior knowledge or analysis of the actual usage statistics of files on the storage device.

The concept is to use existing knowledge or empirically derived information about the storage device, file system, operating system, or other related components on which the data or files will be stored and/or processed to determine and apply a predictive and improved method in which to physically group and order a plurality thereof, thereby improving system performance.

For example, in the case of files residing on a hard drive, the objective is to derive and apply an efficient file grouping and ordering system based not only on information potentially contained inside the files themselves but also on information deducible from other logical information such as a file directory index ordering, operating system nuances, and file system characteristics, to keep the files belonging to logically predictable groups in correlating physical groups on the disk, and to arrange these groups and the files within them in a way that leads to improved overall system performance. Furthermore, reducing overall data entropy leads to faster collective file access times and results in a physical organization structure that, by nature, minimizes the rate of re-fragmentation of both files and free space.

The specific grouping technique and method of organization is determined by monitoring and analyzing system operation, as well as through empirically derived information based on preexisting knowledge or analysis of analogous computer or operating systems that use analogous storage devices with analogous file systems. Discrete data or files are stored once within the highest priority group to which they are determined to be related. For example, in the case of a hard drive used by the Microsoft Windows 7™ operating system, a preferred embodiment of the present invention may result in the following file groupings:

1. Prefetch files (highest priority)
2. Win32/64 system files
3. Program data and user data
4. Program files
5. Windows OS directory tree
6. User files directory tree
7. All remaining files (lowest priority)

The determination technique for group membership varies by group and storage context, but leverages information such as file directory or index structure, knowledge of operating system functioning, and file system organizational structure.

Within each group, according to a preferred embodiment, the member files are physically organized on the storage device according to the file directory or index structure of the file system. For example, many file system directory indexes are organized as a nested or hierarchical tree structure with an initial node representing the root or top-level file directory and numerous folders branching off successively. Accordingly, a preferred embodiment of the present invention analyzes the file directory structure of a storage device, and physically groups the files on the storage device first in accordance with any pre-determined categories of priority, and then organizes and orders them in accordance with where the file is logically located within the directory structure of the storage device.

According to one embodiment of the invention, one or more groups of files may be prioritized on the storage device by moving the group to physical locations known to exhibit faster access and processing speeds, with the highest priority group being written to the fastest location and so forth. Hence, an embodiment of the present invention, when executed on a storage device, may thus first move groups of the highest-priority files into contiguous units within these higher-speed locations, and then continue to physically reorganize the remaining files on the storage device (that are not members of prioritized groups) into contiguous units according to their logical ordering within the file system's directory structure.

To reduce data entropy within a storage device, the files are physically stored in such a way to increase the likelihood that a file which would likely be processed next in a particular sequence is as close to (in close proximity to, if not adjacent to) the current file being processed, thus making such sequential access as fast and efficient as possible. According to one embodiment, within each group, files within each directory on the storage device are organized chronologically based on the order in which they were originally written to storage or "installed." The files may be ordered in different fashion, depending on particular characteristics of a given system. Generally, any consistent order is better than no order. This approach generally creates a more efficient and predictive sequential access order that is more effective for accelerating overall system performance.

In contrast to the prior art approaches, the novel data organization method of the present invention significantly improves the free space degradation problem, reducing the speed with which improvements are lost and leading to faster subsequent operations which result in (but are not limited to) free-space defragmentation. Furthermore, reducing data entropy by hierarchically grouping and naturally ordering files creates an organizational structure that is significantly more resistant to free space fragmentation as well as new file fragmentation, which thereby achieves improved sustainable data contiguity and performance over greater periods of time.

In previously known methods, the defragmentation programs required expending considerable processing resources to create areas of free space, such as, for example, by first moving data to the "back" of a storage device in order to create usable free space in the "front" of the device. In such a system, the files then have to be moved back as part of each defragmentation process. In contrast, the present technique does not require any initial processing to create free space. Specifically, the present inventors have observed that it is advantageous to use the existing units of free space ("chunks") already present on a storage device, and that each successive operation, by nature, results in incremental consolidation of free space, and thus physically used space is similarly consolidated. This simplification of the defragmentation process leads to a faster re-arrangement processing without loss in effectiveness.

Alternative re-arrangement algorithms can easily be imagined that balance the magnitude of the data entropy improvement against other characteristics. For example, the time consumed by the re-arrangement process, and the time consumed by planning the re-arrangement process should all be considered when determining an algorithm for a particular application. The key is that the evaluation of the level of data entropy is included in the determination.

The magnitude of improvement in overall system performance resulting from the re-arrangement process depends upon the initial state of the system. Iterating the re-arrangement process may yield progressive improvements in overall performance. As discussed herein, the process may be iterated based on threshold values of data entropy.

Unlike previously known techniques, the present invention can be used in advance of system operation on all data within an entire storage device, thereby resulting in data storage organization that is optimized before first use, in contrast to those systems where only a subset of frequently used files are cached and/or prioritized based on empirical data collected after extended use.

Also, the present invention, unlike other techniques, may be used to determine—a priori—the most optimal place to store a file or discrete unit of data (before it is ever written to the storage device) based on the existing logical and physical location of related data, such as other files and directories. An example of how this could be advantageous is if a software manufacturer wants to ensure that when its programs are initially installed on a computer system, the programs will set up to run as quickly and efficiently as possible from the outset. As another example, the makers of a file or operating system may wish to keep a storage device optimized for maximum performance as new data is being written to it, and thereby minimize the need for later optimization operations.

The operation of a preferred embodiment of the present invention is illustrated in the high-level flow chart of FIG. 1. The present invention is implemented in software designed to be executed on a processor for executing the processing steps described herein. At step 1, the storage volume is analyzed to determine the file system index structure. Next, at step 2, the directories and related files within the directories are determined based on the file system index structure. At step 3, the available free space on the storage device is analyzed. Optionally, if any special files would benefit from being loaded into any specific locations, the program places these special files into the specified locations at step 4. The remaining files are then re-organized on the storage device, and written in sequential and contiguous units according to their logical file system index directory structural order (which also reduces or eliminates free space and file fragmentation in the process), at step 5. This results in a storage device having related files (in the sense of being in the same or an adjoining directory) stored contiguously on the storage device, and the storage device is also de-fragmented as a result. Finally, the program or program operator may automatically or manually analyze the storage device for increasing levels of data entropy and re-execute all or some of the above-described steps in order to maintain system performance (step 6).

The present invention may also be run as a background process to continually monitor the file system and performance and re-execute the re-organization routines as needed to minimize data entropy and maintain performance, as described with respect to step 6 above.

Figure 2:
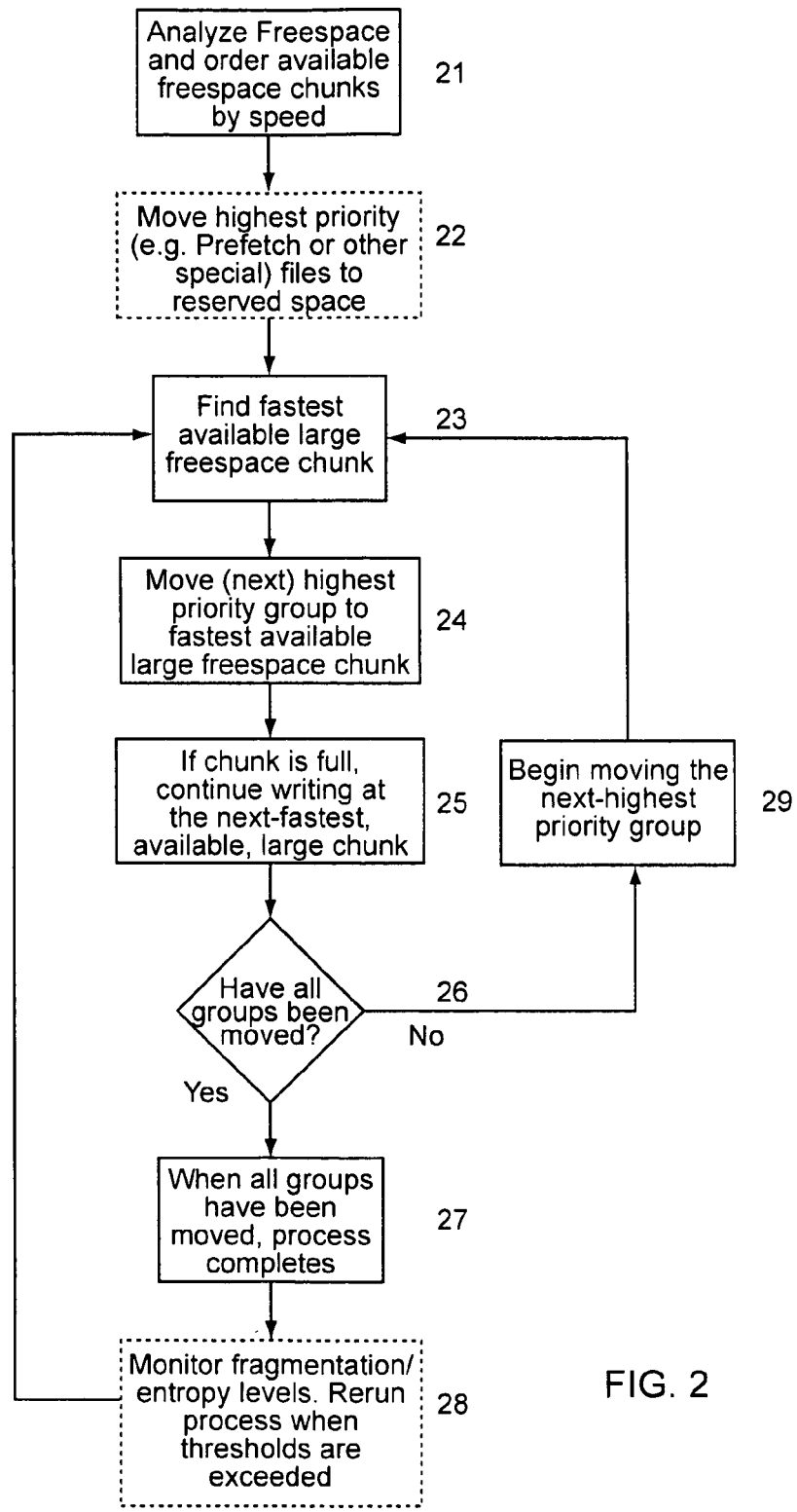
FIG. 2 is a flow chart illustrating an embodiment of the procedure to organize data and files on a storage device according to an embodiment of the present invention.

FIG. 2 is a more detailed flow chart illustrating one approach to moving and ordering the data and files on a storage device. At step 21, the volume freespace is analyzed, and the available freespace "chunks" (contiguous freespace) is determined. The freespace chunks are ordered in terms of relative access speed, such that higher priority files can be placed on faster chunks. The highest available group is optionally moved to a special, reserved area on the disk, such as Microsoft Windows™ Prefetch files at step 22. The system then determines the fastest available free space chunk (step 23), and begins moving the highest priority group remaining to the fastest available chunk (step 24). The groupings used, for example, may be the seven listed groups identified above in connection with the Microsoft Windows™ operating system. If a chunk fills up before the entire group has been written, the next-fastest available large chunk is selected (step 25), and the remaining files are written to the storage device. While there are remaining groups to be stored (step 26), this process repeats (step 29). Once all the groups have been moved, the process completes at step 27. As noted above, application of this process provides the advantage that no files need to be pre-moved, whereby there is incremental free space consolidation over time.

The process may optionally monitor the level of fragmentation and/or data entropy levels, and re-run the process whenever certain predetermined threshold levels are exceeded.

FIG. 3 illustrates a sample partial directory structure from a storage device storing the Adobe™ Reader 9.0 program, available from Adobe Systems, Inc. If this program were to be installed on to a new empty storage device, each of the files that comprise the entire program installation may be stored physically together on the storage medium, one after another in a linear sequence. However, if the program is installed on a storage device that has already been in regular use and therefore has a multitude of existing files stored in various physical locations, the new files being installed are more likely to also be stored in physical various locations all over the device.

Figure 4:
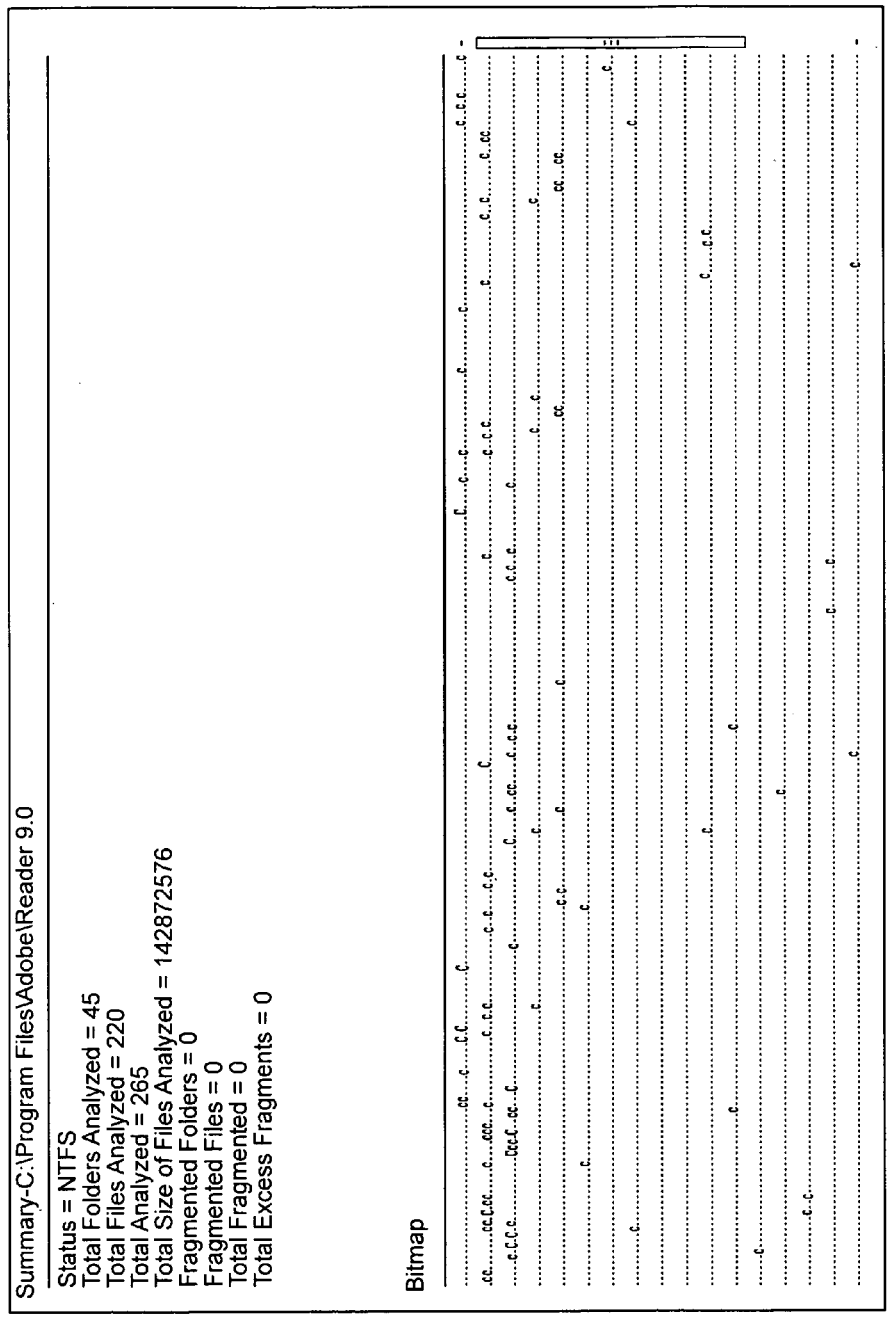
FIG. 4 is a sample screen shot showing the relative fragmentation of a storage device prior to processing by an embodiment present invention.

As illustrated in FIG. 4, the relative location of contiguous folders "C" and contiguous files "c" on a storage device are depicted. Note that even though the files are related to each other as part of a program installation and likely to be read or processed consecutively or in sequence as the program is loaded into memory or used, they are actually physically scattered all over the drive, representing a significant level of data entropy. If the storage device is a mechanical hard drive, the head that reads data will have to be moved many times to retrieve all the related application files, whereas if the files were physically organized into a wholly or partially predictive order, the head that reads data would require far less movements to perform the same operation.

Figure 5:
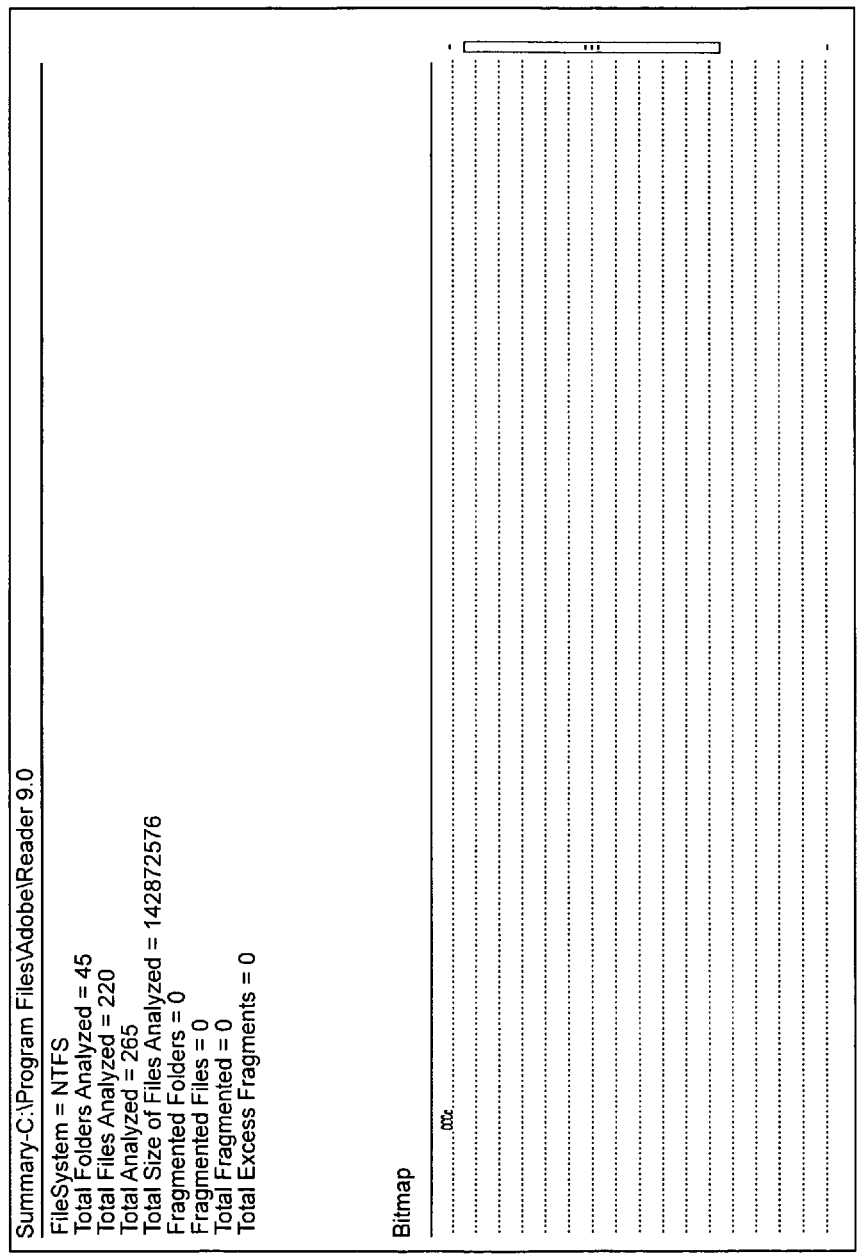
FIG. 5 is a sample screen shot showing how the files are re-arranged after processing by the present invention.
Figure 6:
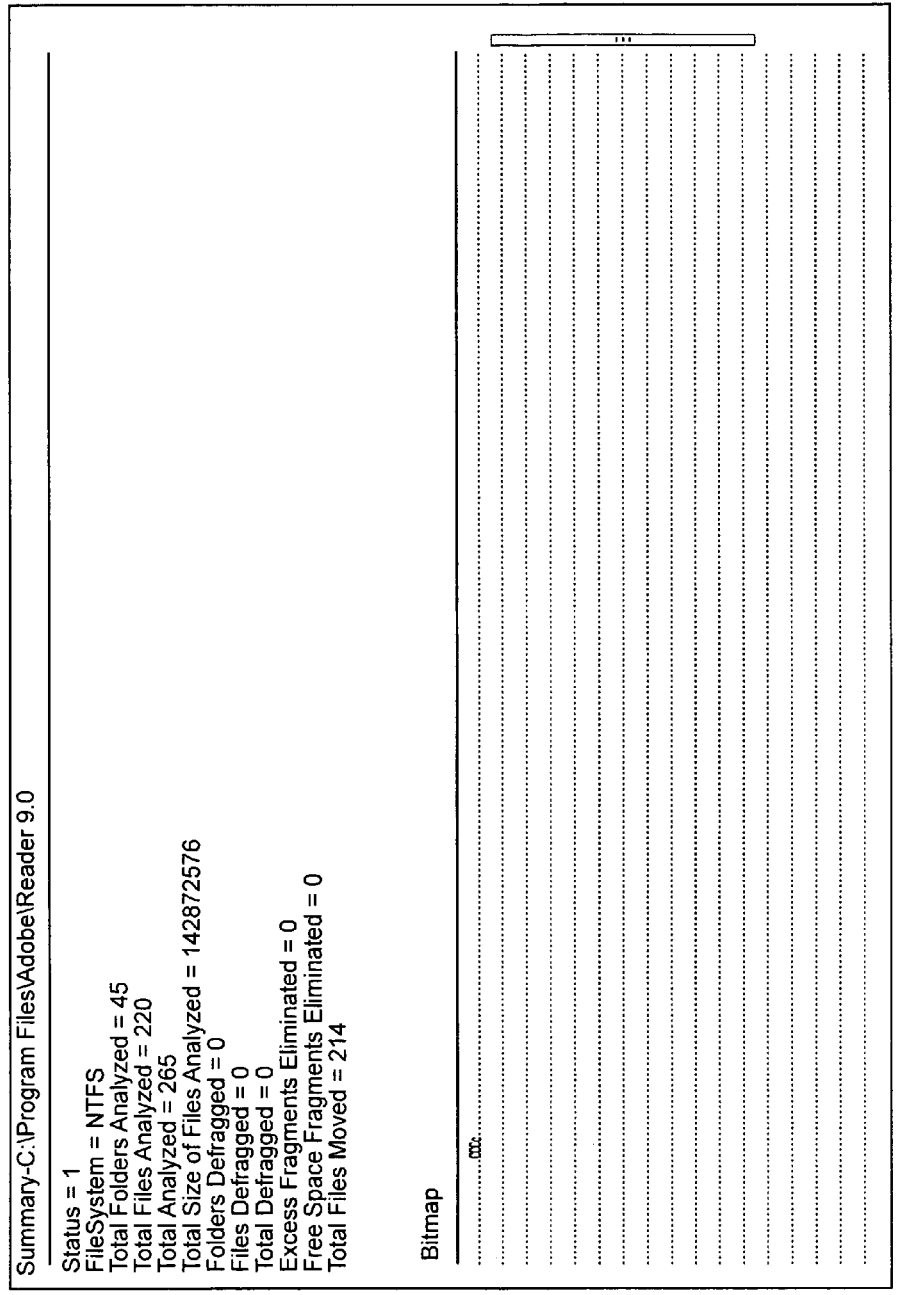
FIG. 6 is a sample screen shot showing how the files are re-arranged, and also illustrating where the files originated.

After a software program that embodies the present invention is executed, the files for the "Adobe" directory (where all of the data components of the Adobe™ Reader 9.0 program logically reside) are now organized into a contiguous location on the storage device, as shown in FIG. 5. FIG. 6 further illustrates how the files of FIG. 4 were moved are organized, where the ":" symbol indicates a file's prior physical location on the storage device.

Thus, as illustrated in FIGS. 4-6, the present invention provides several benefits to improve system performance. First, it provides a more efficient and predictable physical organization of data on a storage device (less data entropy), such that files that are very likely to be accessed in consecutive sequences are physically located near each other on the storage device. Second, as this physical organization is carried out, each data file that is moved is also effectively de-fragmented which further improves system performance (even less data entropy). Additionally, because the physical organization of data on the storage device has been made more analogous to its logical structure, future re-organizations are likely to require far less time and effort.

In another embodiment, the present invention can be augmented by focusing on the more volatile locations of a storage device's data structure, where, for example, the rate of change via addition, modification, and deletion is higher than that of other locations. By focusing on these volatile locations, a program that embodies the present invention could also perform more frequent re-organizations of the data contained within these areas, thus ensuring a stable and efficient overall organization of data within the device, without the need to process data that has not likely fallen out of an efficient structure each time a re-organization is performed.

Specifically, it has been observed that levels of data entropy (such as file fragmentation, free space fragmentation, and a loss of optimal physical file location) tends to increase more rapidly in certain areas of a storage device. These specific locations may vary depending on the file system used to store data, the operating system that utilizes the device, the computer equipment used to run the operating system, and other factors of context. Generally, however, for a particular context of use there will be certain specific locations with a storage device that are subject to these higher rates of escalating data entropy.

Figure 7:
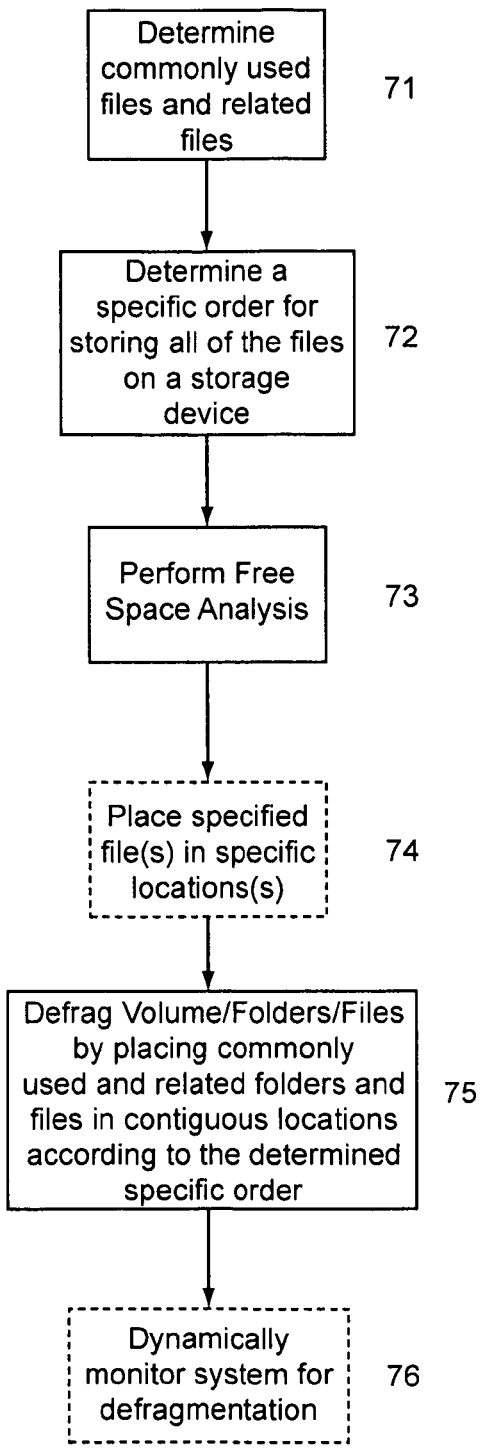
FIG. 7 is a flow chart of an alternate embodiment of the present invention.

An alternate embodiment of the present invention is illustrated by the flowchart of FIG. 7. By using well known methods for monitoring the operation of a computer system and its related data storage device(s), the most commonly accessed data (or files) can be determined. In addition to these commonly accessed files, a set of related files may be determined by analyzing other information within the storage device such as its logical file organization, internal file content, file data types, and so on. Related files may be files likely to also be accessed when one of the commonly accessed files is processed, either through an inherent dependency, a logical grouping within a single file directory, or one or more other empirically derived associative factors such as a file likely to be opened for editing when a certain other file is accessed which causes a program to start that is designed to edit files of this type.

Based on the determination of commonly used files and/or their related files (step 71), a specific order for storing the files on the storage device is determined at step 72. The method of determining a more efficient ordering sequence for these files also includes determining efficient and/or predictive storage locations for all the other files on the storage device, not just those determined at step 71. A storage device's available free space is analyzed at step 73. Certain items such as key operating system, application, or data files may be moved to and organized within certain specified physical locations at step 74. Then, at step 75, any remaining data on the storage device may be re-organized for efficiency by re-locating discrete data entities in a contiguous manner according to the order determined at step 72.

As described above, one application of the present invention may be to dynamically monitor the system and pro-actively keep the contents of the storage device physically organized at step 76. This technique may include monitoring the entire storage device, or only certain known or determined locations that are subject to higher levels of data entropy as the device is used.

Figure 8:
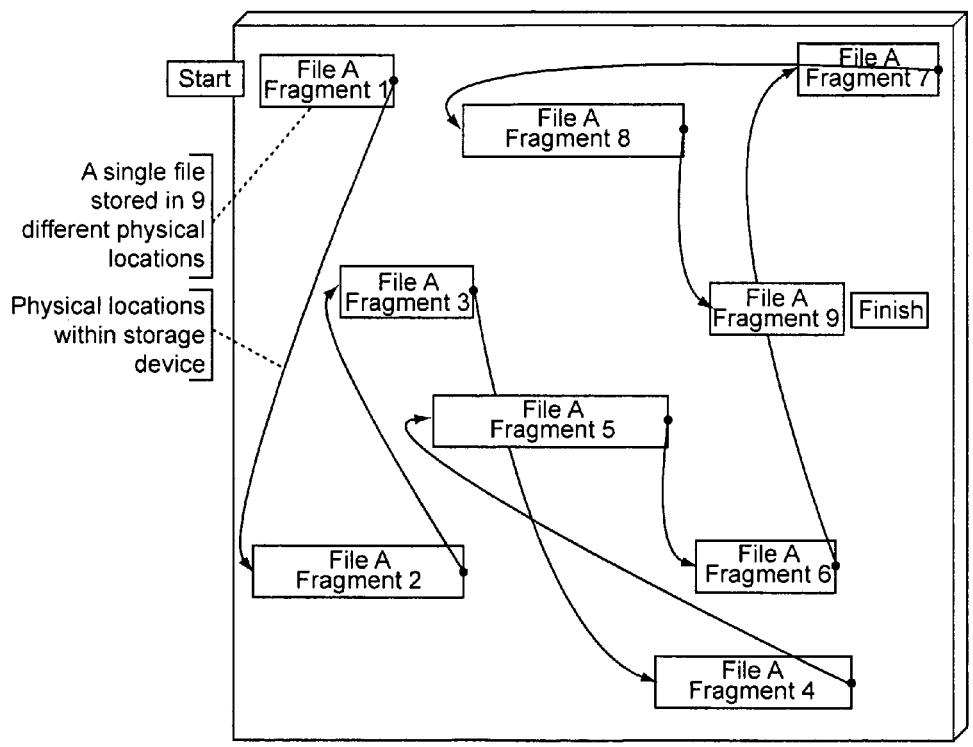
FIG. 8 illustrates how a storage device typically reads a single fragmented file.
Figure 9:
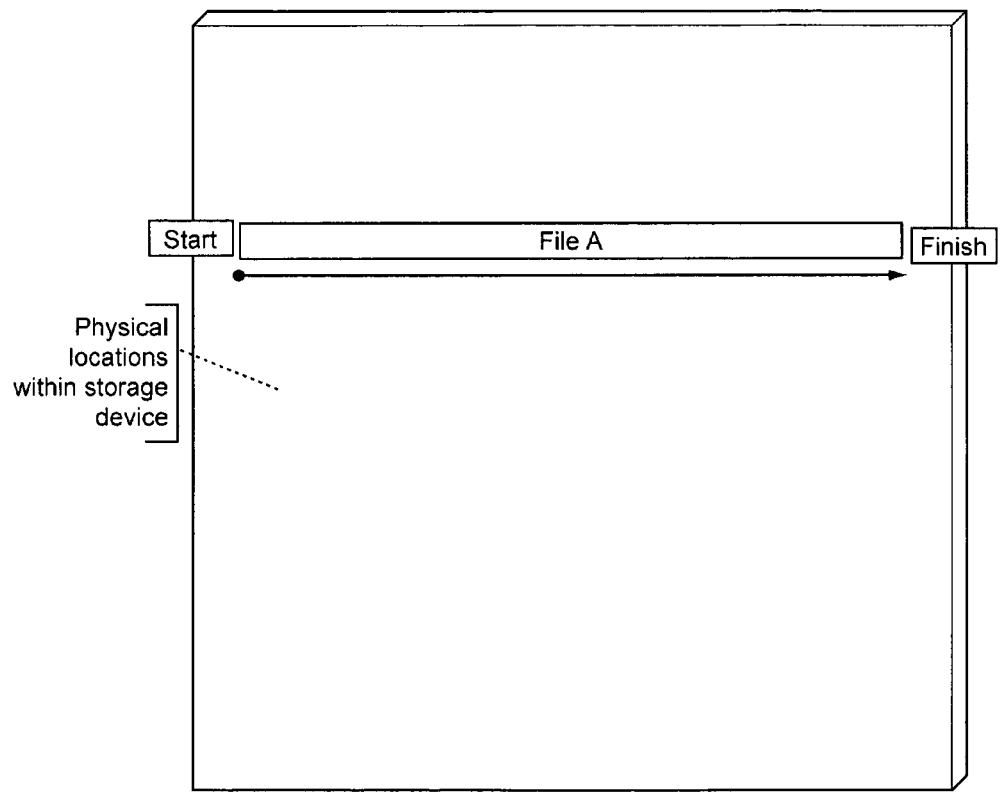
FIG. 9 illustrates how a storage device typically reads a single contiguous file, after file de-fragmentation has been performed.

FIGS. 8-14 provide a more detailed illustration of how the files physically are manipulated on the disk. FIG. 8 illustrates how a storage device typically reads a single fragmented file. Note that a single file is stored in nine different pieces at nine different physical locations. Obviously, this makes accessing this file very time consuming. FIG. 9 illustrates how a storage device typically reads a single contiguous file, after file defragmentation has been performed. In this instance, the storage device can simply read the single file from start to finish, without having to perform any mechanical repositioning.

Figure 10:
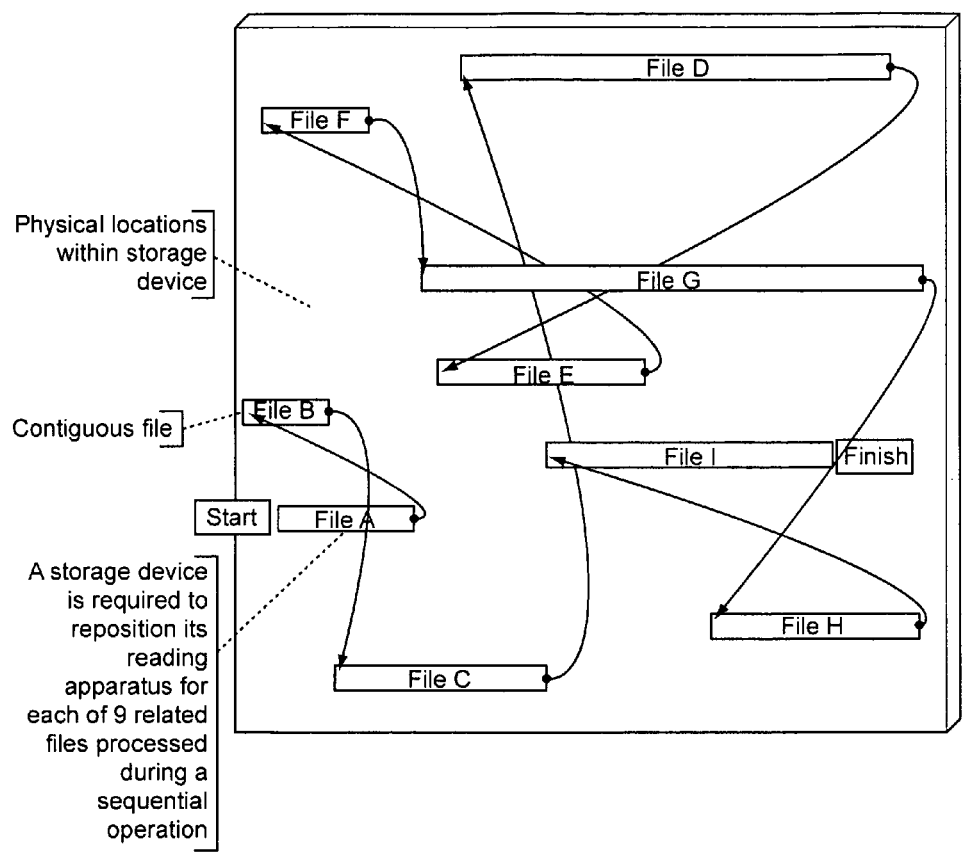
FIG. 10 illustrates how a storage device typically reads multiple data files in sequence without file fragmentation, but with data entropy.
Figure 11:
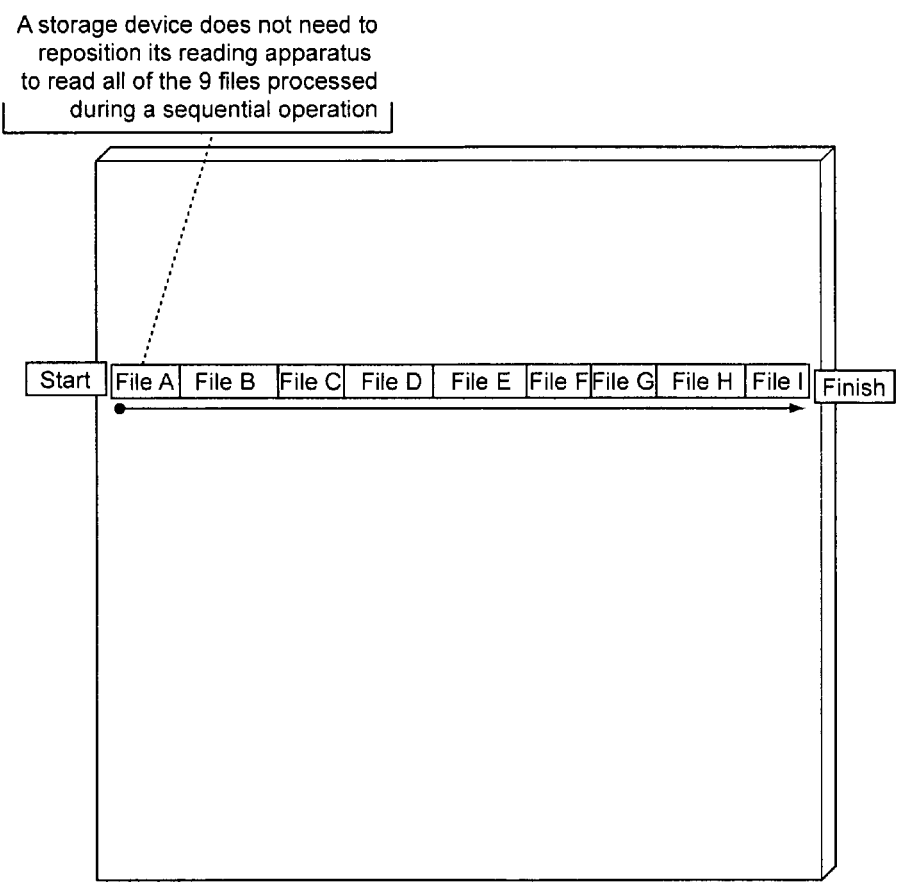
FIG. 11 illustrates how a storage device reads multiple related files with no data entropy and no file fragmentation.

FIG. 10 illustrates how a storage device typically reads multiple data files in sequence without file fragmentation, but with data entropy. In other words, the files are not fragmented, but are located in different physical locations on the storage device. In this example, it can be seen that "data entropy", in the sense of related files that are scattered across a storage device, also causes access delays, similar to the fragmentation of a single file. When the present invention is applied to such a storage device, related files are co-located and deframented as shown in FIG. 11. The storage device can read multiple related files without requiring any mechanical repositioning to read the files. In the case of solid state storage devices, the present technique reduces the "computational" effort required to read a single file. By eliminating or reducing data entropy and file fragmentation, the present technique significantly improves overall system performance.

Figure 12:
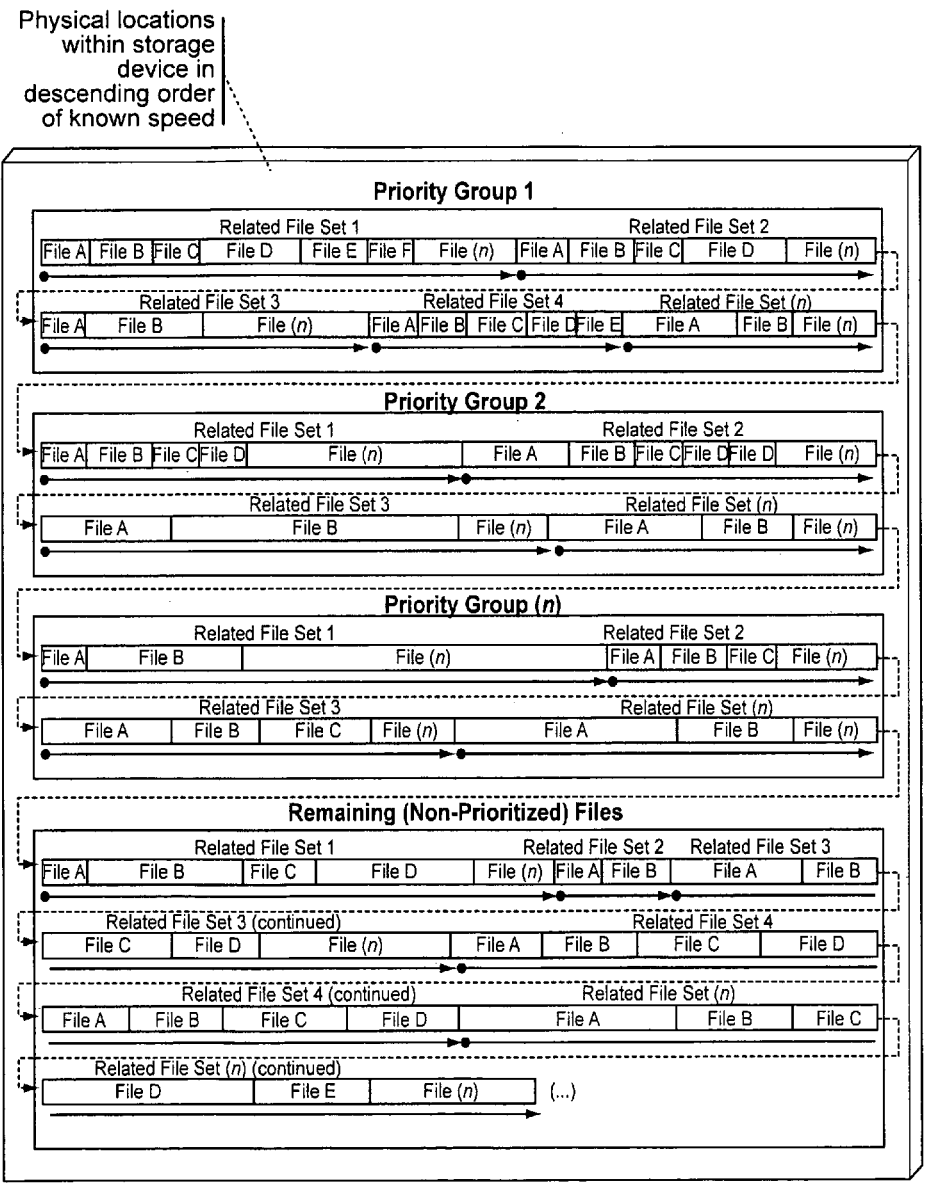
FIG. 12 illustrates, according to an embodiment of the present invention, how files may be organized and ordered on a storage device within prioritized groups to minimize data entropy and eliminate file and free space fragmentation.

In further detail, FIG. 12 illustrates, according to an embodiment of the present invention, how files may be organized and ordered on a storage device within prioritized groups to minimize data entropy and eliminate file and free space fragmentation. Within each priority group, the related files are stored in sets at physically contiguous locations on the storage device. For example, each set could correspond to a directory of related files, as described above. As previously noted, the priority groups are preferably placed on the storage device in locations of decending order of access speed. Note that file system-specific meta-data may be stored in a similar fashion.

Figure 13:
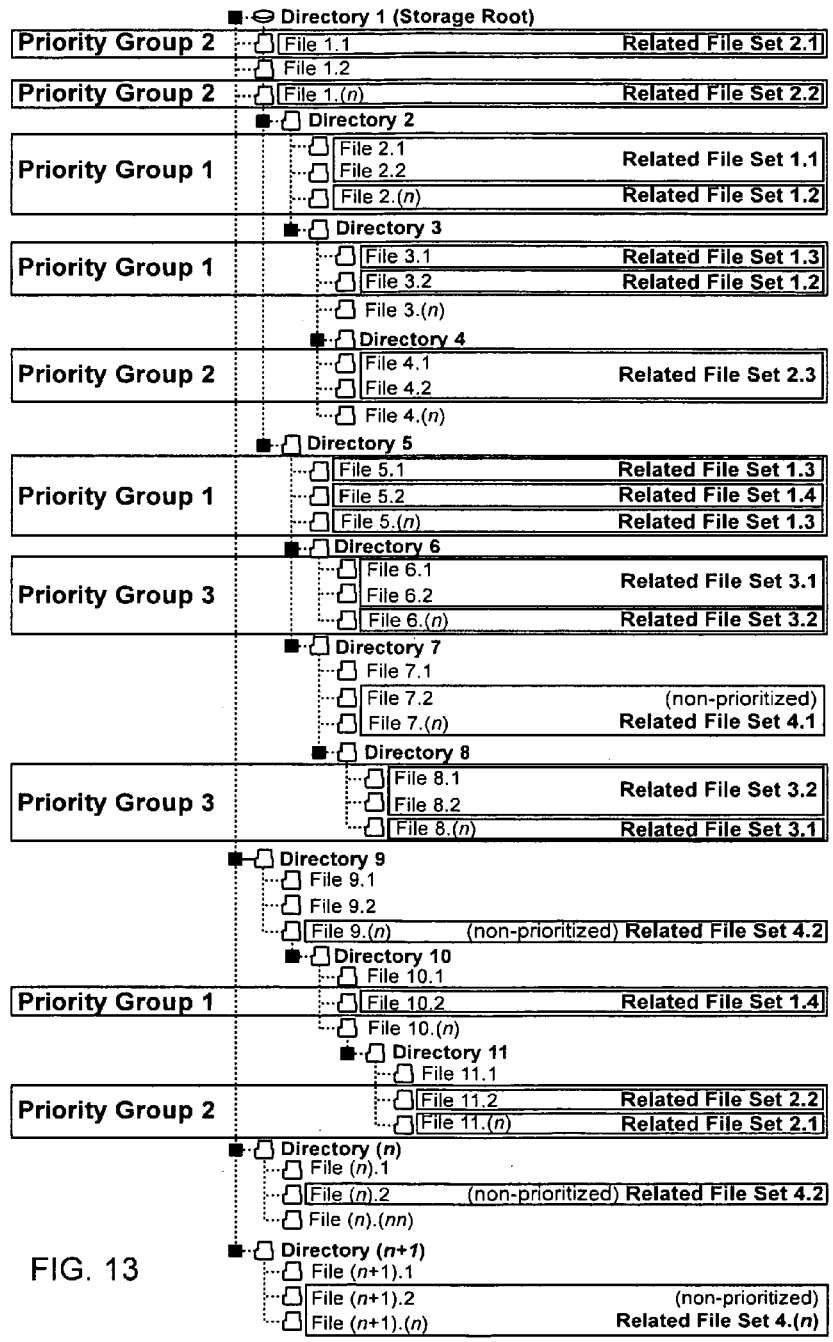
FIG. 13 illustrates, according to an embodiment of the present invention, how data and files may be organized and ordered according to an existing logical index within prioritized groups.

As a detailed example, FIG. 13 illustrates, according to an embodiment of the present invention, how data and files may be organized and ordered according to an existing logical index within prioritized groups. Within each priority grouping, the directories are sequenced for placement on the storage device. Within certain directories, some files may not be prioritized (although others may be), and can be stored last, according to the logical index order of the files.

Figure 14:
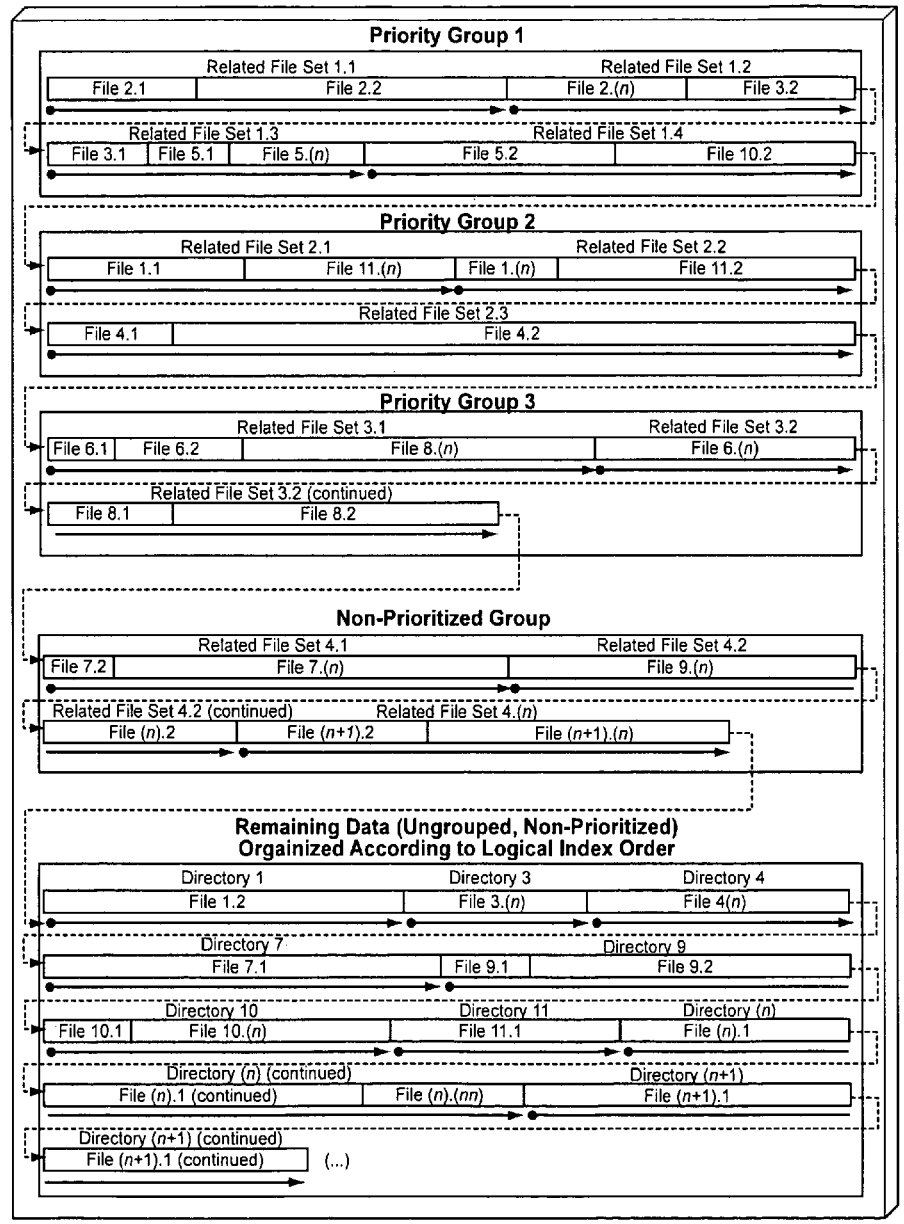
FIG. 14 illustrates, according to an embodiment of the present invention, how data and files may be physically organized and ordered on a storage device according to the existing logical index within prioritized groups of FIG. 13.

FIG. 14 illustrates, according to an embodiment of the present invention, how data and files may be physically organized and ordered on a storage device according to the existing logical index within prioritized groups of FIG. 13. Note that files from FIG. 13 are reordered and physically placed at contiguous locations on the storage device. This results in files in a priority group placed in contiguous locations, with the storage device effectively defragmented and data entropy greatly reduced.

Portions of the present invention may be conveniently implemented using a conventional general-purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW+/−, microdrive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, and the display, storage, or communication of results according to the processes of the present invention.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A computer-implemented method for arranging files on a computer system storage device, comprising:
   determining commonly used files based on an analysis of a type of computer system utilizing the storage device, including determining a type of operating system;
   determining commonly used files, and any related files, by monitoring system operation;
   determining a specific physical order to store the files on the storage device based on the determinations of commonly used files and related files;
   analyzing available fee space on the storage device;
   re-arranging pre-determining files and placing the predetermined files in a pre-determined location before re-arranging any remaining files; and
   re-arranging any remaining files on the storage device according to the determined specific order by placing the files in sequential and contiguous locations on the storage device in a directory structure of a file system;
   wherein the analyzing of available free space and the re-arranging of the files are performed dynamically during system operation.

2. The method of claim 1, wherein the files are physically placed on the storage device according to a priority grouping of related files, wherein the prioritized grouping of files are placed contiguously in a next available prioritized free space chunk, and if the next free space chunk is filled before an entire grouping of files is stored, an additional free space chunk is selected for storing the grouping of files.

3. The method of claim 1, further comprising:
   determining locations on the storage device which have a rate of data entropy higher than a threshold value;
   monitoring the locations which have been determined to have a rate of data entropy higher than the threshold value; and
   automatically performing the steps of analyzing available free space and re-arranging the files on the determined locations, when the rate of data entropy exceeds the threshold value.

4. The method of claim 1, wherein the storage device is a hard disk drive, and the files are placed on the disk drive to reduce head movement when accessing related files.

5. The method of claim 1, wherein the step of re-arranging the files minimizes data entropy including file fragmentation on the storage device.

6. A computer readable non-transitory medium including computer program code for arranging data files on a data storage device, said computer readable non-transitory medium comprising:
   computer program code for determining logical data relationships of files on a data storage device;
   computer program code for identifying a first sub-set of commonly used files based on a type of computer system accessing the storage device;
   computer program code for monitoring system operation to determine a second sub-set of data or files that are commonly used during system operation;
   computer program code for re-arranging the determined first and second sub-sets of commonly used files, and any related files, by storing the first and second sub-sets and any related files in physically contiguous groups on the storage device;
   computer program code for analyzing free space on the storage device;
   computer program code for placing pre-determined files in a pre-determined location before re-arranging any remaining files; and
   computer program code for re-arranging any remaining files on the storage device by placing logically related files in a file directory structure in close proximity to each other physically on the storage device, based on the determined logical data relationships;
   wherein the re-arranging is performed for substantially all of the files on the storage device; and
   wherein the computer program code for analyzing available free space and re-arranging the files are executed dynamically during system operation.

7. The computer readable medium of claim 6, wherein the computer program code for determining logical data relationships comprises computer program code for determining a file directory index structure of a computer system file system.

8. The computer readable medium of claim 7, further comprising computer program code for storing sets of logically related files from each folder of the file directory structure in a logical order contiguously on the storage device.

9. The computer readable medium of claim 7, further comprising computer program code for physically placing the files on the storage device according to a priority grouping of related files.

10. The computer readable medium of claim 9, further comprising computer program code for placing a prioritized grouping of files contiguously in a next available prioritized free space chunk, and if the next free space chunk is filled before an entire grouping of files is stored, an additional free space chunk is selected for storing the grouping of files.

11. The computer readable medium of claim 7, further comprising:
    computer program code for determining locations on the storage device which have a rate of data entropy higher than a threshold value;
    computer program code for monitoring the locations which have been determined to have a data entropy rate higher than the threshold value; and
    computer program code for automatically performing the steps of analyzing available free space and re-arranging the files on the determined locations.

12. A computer readable non-transitory medium including computer program code for reducing data entropy on a data storage device of a computer system, the computer readable non-transitory medium comprising:
    computer program code for determining a file directory indexing structure of a file system on a data storage device, including directories and files;
    computer program code for identifying a first sub-set of commonly used files based on a type of computer system accessing the storage device;

computer program code for monitoring system operation to determine a second sub-set of data or files that are commonly used during system operation;
computer program code for re-arranging the determined first and second sub-sets of commonly used files, and any related files, by storing the first and second sub-sets of files and any related files in physically contiguous groups on the storage device;
computer program code for analyzing available free space on the storage device;
computer program code for placing pre-determined files in a pre-determined location; and
computer program code for re-arranging all remaining files on the storage device by placing logically related files in a file directory structure in close proximity to each other physically on the storage device, based on the file directory indexing structure; wherein the files are physically placed on the storage device according to a priority grouping of related files, wherein the prioritized grouping of files are placed contiguously in a next available prioritized free space chunk, and if the next fee space chunk is filled before an entire grouping of files is stored, an additional free space chunk is selected for storing the grouping of files;
wherein the computer program code for analyzing available free space and re-arranging the files are executed dynamically during system operation, and the resulting files are re-arranged in the file directory structure.

13. A computer system for arranging data files on a data storage device, said computer system comprising:
a processor for executing computer program code, the computer code comprising:
computer program code for determining logical data relationships of files on a data storage device;
computer program code for identifying a first sub-set of commonly used files based on a type of computer system accessing the storage device;
computer program code for monitoring system operation to determine a second sub-set of data or files that are commonly used during system operation;
computer program code for re-arranging the determined first and second sub-sets of commonly used files, and any related files, by storing the first and second sub-sets of files and any related files in physically contiguous groups on the storage device;
computer program code for placing pre-determined files in a pre-determined location before re-arranging any remaining files; and
computer program code for re-arranging any remaining files on the storage device by placing logically related files in close proximity to each other physically on the storage device, based on the determined logical data relationships;
wherein the re-arranging is performed for substantially all of the files on the storage device; and
wherein the computer program code for re-arranging the files is executed dynamically during system operation.

14. The computer system of claim 13, wherein the computer program code for determining logical data relationships comprises computer program code for determining a file directory index structure of a computer system file system.

15. The computer system of claim 13, further comprising computer program code for analyzing available free space on the storage device before re-arranging the files.

16. The computer system of claim 15, further comprising computer program code for storing sets of logically related files from each folder of the file directory structure in a logical order contiguously on the storage device.

17. The computer system of claim 15, further comprising computer program code for physical placing the files on the storage device according to a priority grouping of related files.

18. The computer system of claim 17, further comprising computer program code for placing a prioritized grouping of files contiguously in a next available prioritized free space chunk, and if the next free space chunk is filled before an entire grouping of files is stored, an additional free space chunk is selected for storing the grouping of files.

19. The computer system of claim 15, further comprising:
computer program code for determining locations on the storage device which have a rate of data entropy higher than a threshold value;
computer program code for monitoring the locations which have been determined to have a data entropy rate higher than the threshold value; and
computer program code for automatically performing the steps of analyzing available free space and re-arranging the files on the determined locations.

20. A computer system for arranging files on a computer system storage device, the computer system comprising:
a processor for executing computer program code, the computer program code comprising:
computer program code for determining commonly used files based on an analysis of a type of computer system utilizing the storage device, including determining a type of operating system;
computer program code for determining commonly used files, and any related files, by monitoring system operation;
computer program code for determining a specific physical order to store the files on the storage device based on the determinations of commonly used files and related files;
computer program code for analyzing available free space on the storage device;
computer program code for re-arranging predetermined files and placing the predetermined files in a pre-determined location before re-arranging any remaining files; and
computer program code for re-arranging any remaining files on the storage device according to the determined specific order by placing the files in sequential and contiguous locations on the storage device in a file directory structure;
wherein the computer program code for analyzing available free space and re-arranging the files are executed dynamically during system operation and the resulting files are re-arranged in the file directory structure.

21. The computer system of claim 20, further comprising computer program code for physically placing on the storage device according to a priority grouping of related files, wherein the prioritized grouping of files are placed contiguous in a next available prioritized free space chunk, and if the next free space chunk is filled before an entire grouping of files is stored, an additional free space chunk is selected for storing the grouping of files.

22. The computer system of claim 20, further comprising:
computer program code for determining locations on the storage device which have a rate of data entropy higher than a threshold value;
computer program code for monitoring the locations which have been determined to have a data entropy higher than the threshold value; and computer program code for automatically performing the steps of analyzing available free space and re-arranging the files on the determined locations, when the rate of data entropy exceeds the threshold value.

23. A computer readable non-transitory medium including computer program code for arranging data files on a data storage device, said computer readable non-transitory medium comprising:
- computer program code for determining logical data relationships of files on a data storage device;
- computer program code for analyzing available free space on the storage device;
- computer program code for identifying a first sub-set of commonly used files based on a type of computer system accessing the storage device;
- computer program code for monitoring system operation to determine a second sub-set of data or files that are commonly used during system operation; and
- computer program code for re-arranging the determined first and second sub-sets of commonly used files, and any related files, by storing the first and second sub-sets of files and any related files in physically contiguous groups on the storage device;
- computer program code for re-arranging the files on the storage device by placing logically related files in close proximity to each other physically on the storage device, based on the determined logical data relationships;
- computer program code for determining locations on the storage device which have a rate of data entropy higher than a threshold value;
- computer program code for monitoring the locations which have been determined to have a data entropy rate higher than the threshold value;
- computer program code for automatically performing the steps of analyzing available free space and re-arranging the files on the determined locations; and
- wherein the re-arranging is performed without any prior analysis of file usage; and wherein the computer program code for analyzing available free space and re-arranging the files are executed dynamically during system operation and the resulting files are re-arranged in the file directory structure.

24. The computer readable medium of claim 23, wherein the computer program code for determining logical data relationships comprises computer program code for determining a file directory index structure of a computer system file system.

25. The computer readable medium of claim 24, further comprising computer program code for placing pre-determined files in a pre-determined location before re-arranging the remaining files.

26. The computer readable medium of claim 25, further comprising computer code for storing sets of logically related files from each folder of the file directory structure in a logical order contiguously on the storage device.

27. The computer readable medium of claim 24, further comprising computer code for physically placing the files on the storage device according to a priority grouping of related files.

28. The computer readable medium of claim 27, further comprising computer program code for placing a prioritized grouping of files contiguously in a next available prioritized free space chunk, and if the next free space chunk is filled before an entire grouping of files is stored, an additional free space chunk is selected for storing the grouping of files.

29. A computer-implemented method for arranging files on a computer system storage device, comprising:
- determining commonly used files based on an analysis of a type of computer system utilizing the storage device, including determining a type of operating system;
- determining commonly used files, and any related files, by monitoring system operation;
- determining a specific physical order to store the files on the storage device based on the determinations of commonly used files and related files;
- analyzing available free space on the storage device;
- re-arranging the files on the storage device according to the determined specific order by placing the files in sequential and contiguous locations on the storage device in a directory structure of a file system;
- determining locations on the storage device which have a rate of data entropy higher than a threshold value;
- monitoring the locations which have been determined to have a rate of data entropy higher than the threshold value; and
- automatically performing the steps of analyzing free space and re-arranging the files on the determined locations, when the rate of data entropy exceeds the threshold value.

30. A computer readable non-transitory medium including computer program code for arranging files on a data storage device, said computer readable non-transitory medium comprising:
- computer program code for determining logical data relationships of files on a data storage device;
- computer program code for determining commonly used files, and any related files, by monitoring system operation;
- computer program code for analyzing available free space on the storage device;
- computer program code for re-arranging the files on the storage device by placing logically related files in a file directory structure in close proximity to each other physically on the storage device, based on the determined logical data relationships;
- computer program code for determining locations on the storage device which have a rate of entropy higher than a threshold value;
- computer program code for monitoring the locations which have been determined to have a data entropy rate higher than the threshold value; and
- computer program code for automatically performing the steps of analyzing available free space and re-arranging the files on the determined locations;
- wherein the re-arranging is performed for substantially all of the files on the storage device; and
- wherein the computer program code for analyzing available free space and re-arranging the files are executed dynamically during the system operation.

* * * * *